United States Patent [19]
Auer et al.

[11] Patent Number: 4,984,342
[45] Date of Patent: Jan. 15, 1991

[54] METHOD FOR THE MANUFACTURE OF SOLID ELECTROLYTE CAPACITORS

[75] Inventors: Heinz Auer, Heidenheim-Oggenh; Gernot Winkler, Heidenheim, both of Fed. Rep. of Germany

[73] Assignee: Siemens Aktiengesellschaft, Berlin and Munich, Fed. Rep. of Germany

[21] Appl. No.: 296,800

[22] Filed: Jan. 13, 1989

[30] Foreign Application Priority Data

Jan. 21, 1988 [DE]  Fed. Rep. of Germany ....... 3801729

[51] Int. Cl.$^5$ .............................................. H01G 4/10
[52] U.S. Cl. .................................. 29/25.03; 29/25.42
[58] Field of Search ............................. 29/25.42, 25.03

[56] References Cited

U.S. PATENT DOCUMENTS

| | | | |
|---|---|---|---|
| 3,950,842 | 4/1976 | Fournier et al. | 29/570.1 |
| 4,041,359 | 8/1977 | Mizushima | 361/529 |
| 4,042,420 | 8/1977 | Nishino | 148/272 |
| 4,079,503 | 3/1978 | Schnabel | 29/25.03 |
| 4,104,704 | 8/1978 | Weaver | 361/532 |
| 4,105,513 | 8/1978 | Nishino | 361/532 |
| 4,494,299 | 1/1985 | Franklin | 361/540 |
| 4,706,375 | 11/1987 | Bernard et al. | 29/570.1 |

FOREIGN PATENT DOCUMENTS

| | | | |
|---|---|---|---|
| 1289186 | 2/1969 | Fed. Rep. of Germany . | |
| 1540654 | 9/1968 | France . | |
| 2309026 | 11/1976 | France | 29/570.1 |
| 53-57456 | 5/1978 | Japan | 29/570.1 |
| 53-84157 | 7/1978 | Japan | 29/570.1 |
| 54-132763 | 10/1979 | Japan | 29/570.1 |
| 55-153318 | 11/1980 | Japan | 29/570.1 |
| 56-15026 | 2/1981 | Japan | 29/570.1 |

Primary Examiner—Olik Chaudhuri
Assistant Examiner—Ourmazd S. Ojan
Attorney, Agent, or Firm—Hill, Van Santen, Steadman & Simpson

[57] ABSTRACT

A method for manufacturing solid electrolyte capacitors is provided. Pursuant to the method, pores in formed sintered members composed of a valve metal are first nearly filled with manganese dioxide that is produced by pyrolysis of solutions that contain manganese nitrate. Following thereupon, the sintered members are immersed into a dry melt of manganese nitrate that may comprise an additive of manganese dioxide and/or silicon dioxide powder. Subsequently, the members are introduced into a furnace, and heated to approximately 100° C. in dry air. Subsequently, fine drops of water are applied onto the surface of the heated sintered members and the pyrolysis is ended at temperatures of approximately 200° to about 350° C. in a mist of water vapor that flows by.

17 Claims, 1 Drawing Sheet

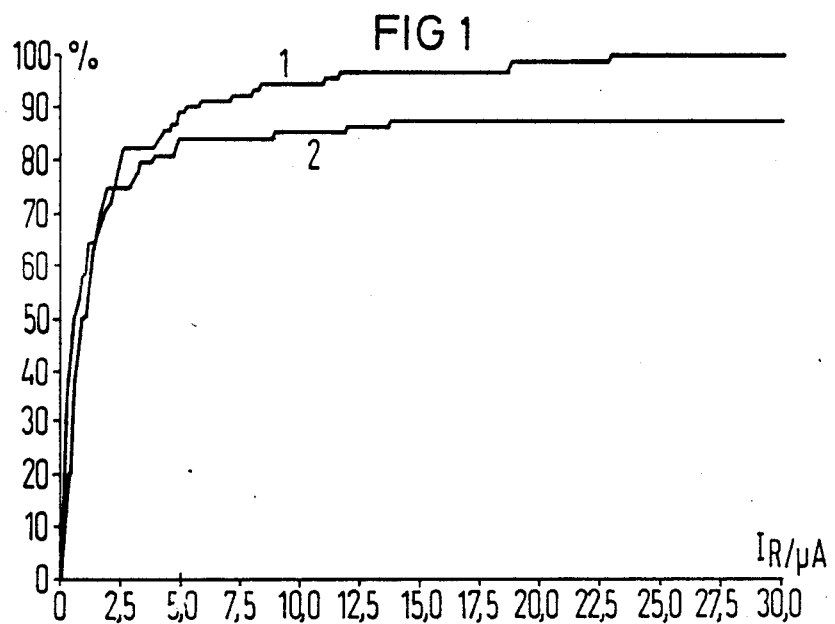
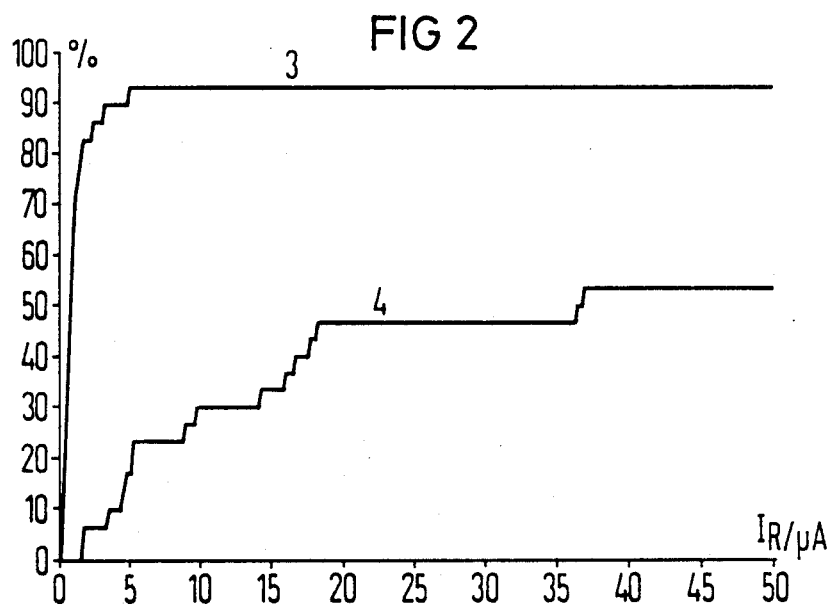

METHOD FOR THE MANUFACTURE OF SOLID ELECTROLYTE CAPACITORS

BACKGROUND OF THE INVENTION

The present invention is directed to a method for the manufacture of solid electrolyte capacitors comprising a sintered anode member composed of a valve metal, an oxide layer arranged on the anode member and serving as a dielectric, a semiconducting electrolyte layer composed of manganese dioxide that is produced by repeated immersion into a solution containing manganese nitrate and subsequent pyrolytic decomposition a graphite layer arranged on the manganese dioxide layer, and a soft-solderable layer arranged on the graphite layer.

The sintered members, composed of a suitable valve metal such as, for example, tantalum or niobium, have their inside and outside surface coated with an oxide layer that functions as a dielectric in an anodic oxidation process. The manganese dioxide layer in and on the sintered members serves as a cooperating electrode. The contact to the negative terminal of the capacitor is produced by the graphite layer located thereupon and a soft-solderable layer (composed, for example, of silver conductive lacquer). A wire of the valve metal sintered into the sintered member functions as the positive terminal.

Tantalum solid electrolyte capacitors are distinguished by a high useful life given simultaneously low temperature dependency of the capacitance, residual current, loss factor, and impedance. The most reliable embodiment of the capacitors is a hermetically sealed construction wherein the capacitor is completely protected against moisture in a metal housing by soft solder and a terminating glass pane.

When the capacitors are housed in a plastic housing, an absolute protection against moisture is not provided and there is a higher mechanical stressing due to the thermal expansion of the housing. Plastic envelopes fundamentally exhibit a water vapor diffusion. As a result thereof, potentially disturbing ions from the diffused water can be activated.

It is therefore necessary to make the internal structure of plastic-enveloped capacitors more resistant to the influences of moisture. To measure the reliability of the capacitor, the residual current of the capacitor after long-term tests with strict climatic conditions can be used. For example, the residual current after a long-term test at 85° C. and 95% relative humidity nominal voltage operation without drop resistor, should not exceed $30\mu$ A measured at room temperature given a $20\mu$ F/20 V capacitor.

Beneficial for this purpose is that the low reactivity of the tantalum pentoxide layer alloWs the use of electrolytes having a higher conductivity, this resulting in low equivalent series resistances. Given tantalum solid electrolyte capacitors, however, the cathode coating must have an adequately thick layer of manganese dioxide in order to protect the dielectric against direct contact with graphite and conductive lacquer. This is due to the fact that if the graphite or conductive lacquer is located directly on the tantalum pentoxide layer lead, shorts will occur even given a few percent of the activation voltage.

In manufacturing the manganese dioxide layers, the shaped sintered members are immersed into manganese nitrate in a known fashion, whereby the dielectric surface is moistened with manganese nitrate. This is followed by a thermic decomposition (pyrolysis) of the manganese nitrate at temperatures between 200 and 350° C., whereby $MnO_2$ arises in and on the sintered members. A multi-layer $MnO_2$ coat, that provides an adequate spacing between the highly conductive graphite layer and the following soft-solderable layer, is formed by repetition of this pyrolysis (8 through 15 times) in air, that is either dry or contains water vapor.

Manganese dioxide layers manufactured by these traditional methods are adequate for typical uses. These capacitors exhibit good results, in long-term tests having elevated temperature and operating voltage above the nominal voltage (125° C., $U_N$, 105° C., $U_N$. 1.35), but, without atmospheric humidity; only about 1% of capacitors treated in this manner had a residual current greater than 30 $\mu$ A.

However, given long-term tests with high atmospheric humidity (1,000 hours at 85° C. and 95% relative humidity, $U_N$), these capacitors exhibit a diminished reliability (about 10% of the capacitors had a residual current greater than 30 $\mu$ A, whereby the majority part thereof exhibited a short).

The sporadically occurring outages that occurred during the long-term tests in dry air, represent typical premature outages that can be attributed to latent production defects or impurities in the materials. But, the outages in long-term tests having high atmospheric humidity are based on errors in the structure of the capacitor. The number of outages frequently rises above an acceptable amount given an increasing dwell time in humidity. For comparably manufactured capacitors having a comparable charge and nominal voltage, but that are tightly integrated in a metal housing, long-term tests have not demonstrated any influence of humidity on the capacitors.

The causes for the failure of the barrier effect of the amorphous tantalum pentoxide layer lie in the amorphous tantalum pentoxide layer itself or in a deficient manganese dioxide layer. Increased impurities in the oxide layer disturb the barrier effect and lead to the formation of a crystalline condition due to locally high residual current. This crystalline condition leads to a short when it extends over the entire thickness of the dielectric. When there are crystalline islands in the oxide layer, these regions are subject to outage that, however, can be potentially protected by a local conversion of the manganese dioxide into the more poorly conductive oxidation stage ($MnO_2 \rightarrow Mn_2O_3$, $\rho$ ($MnO_2$)- $\sim 1$-10 Ohm.cm, $\rho(Mn_2O_3) \sim 10^4$-$10^5$ Ohm.cm) via an increased resistance.

These outage mechanisms, that are due to impurities in the oxide layer, however, are not the sole cause for the outages when humidity is present. An evaluation of the tantalum pentoxide layer demonstrates that the layer is in proper order proceeding from the shaping and from its structure. Increased residual currents due to impurities or faulty structure of the oxide layers have not been identified.

The cause of the outage, accordingly, is due to the manganese dioxide layer that enables unfavorable influences on the blocking current behavior of the dielectric due to the inadequate protection the plastic housing provides against moisture.

These unfavorable influences can include particles of graphite, or of conductive lacquer, that penetrate through pores in the manganese dioxide layer and lower the resistance of the cathode coating at individual locations in front of the dielectric. Water vapor that has diffused through the housing promotes a simple diffusion (material transport due to the flow motion of larger volume elements) of graphite and silver particles that do not adhere as well and can thus lead to a short due to low drop resistance preceding the dielectric.

In the silver conductive lacquer that is used as the soft-solderable layer, the silver particles are blended in an organic bonding agent that exhibits a limited temperature loadability. An incipient thermic destruction of the conductive lacquer and, thus, a mechanical release of silver particles is already provided given a slight overheating. Water that has penetrated also leads to a better contact between the dielectric and the manganese dioxide layer, with the ultimate result that locations of the dielectric that are not contacted by manganese dioxide and may be defective are additionally contacted. When, therefore, a local void in the tantalum pentoxide layer that is otherwise not detrimental, coincides with a location of inadequate drop resistance, a potential outage location is established. Due to heating in the presence of the electrical field, locally increased residual current leads to further field crystallization and, thus, to a short.

The effect of the curing mechanism due to the transition of $MnO_2 \rightarrow Mn_2O_3$ can be suppressed due to the regions in the manganese dioxide layer lying close to the dielectric that are contaminated by graphite, silver particles, and water. Accordingly, the high specific resistance of $Mn_2O_3$ is lost.

For the reasons set forth above, it is therefore necessary to produce adequately thick, smooth, and nearly porefree manganese dioxide layers.

Since it is known that the dielectric layer can be damaged due to the thermic stressing of the pyrolysis, it could be concluded that the manufacture of the manganese dioxide layer can be produced by immersion into highly concentrated manganese nitrate solutions. Although fewer immersion and pyrolysis events are required for the manufacture of a defined layer thickness, adequately smooth and nearly pore-free manganese dioxide layers are not obtained. This is due to the fact that, particularly, given a pyrolysis without pre-drying, large pores are produced in the outer manganese dioxide layers due to the escape of the nitrous gas from regions lying farther inside. The risk of pore formation is less given more dilute solutions; however, as previously discussed, roughly 8 through 15 individual immersion and pyrolysis events are required for the manufacture of an adequately thick manganese dioxide layer in order to guarantee an adequate distance of the highly conductive graphite layer and of the following soft-solderable layer from the oxide layer.

Although thermic decomposition in dry air at 200 through 350° C. leads to thick manganese dioxide layers having dimensions of 0.1 mm and more after a few pyrolyses, these layers are highly porous and dissolute. Moreover, due to high porosity, these layers do not provide an adequate distancing of the graphite layer from the dielectric. In contrast, decompositions in air containing water vapor at temperatures between 200 and 250° C. lead to manganese layers that are smoother, more solid, and have fewer pores. However, a large number of immersion and following pyrolysis processes are necessary in order to achieve an adequate layer thickness.

Manganese dioxide layers that lead to usable electrical values of the capacitor arise after 8 through 15 - fold repetitions on the basis of alternating decomposition in dry air and in air containing water vapor. However, a large number of pyrolysis steps that deteriorate the dielectric are thereby still required.

SUMMARY OF THE INVENTION

The present invention provides a method with which adequately thick and nearly pore-free manganese dioxide layers can be produced on the sintered members with a lower number of thermic decompositions.

To this end, the present invention provides a method for the manufacture of solid electrolyte capacitors comprising a sintered anode member composed of a valve metal, an oxide layer arranged on the anode member that functions as a dielectric, a semiconducting electrolyte layer composed of manganese dioxide that is produced by repeated immersion into a solution or, respectively, melt containing manganese nitrate and by subsequent pyrolytic decomposition, a graphite layer arranged on the manganese dioxide layer and a soft-solderable layer arranged thereon. The pores in the interior of the sintered members are first nearly filled with manganese dioxide by pyrolysis of solutions containing manganese nitrate, the sintered members are then immersed once or repeatedly into a mixture that is composed of a dry melt of manganese nitrate and manganese dioxide powder, and the pyrolysis is carried out in a furnace after every immersion such that the sintered members are first heated to about 100° C., within a few seconds, and, following thereafter, fine drops of water are applied onto the surface of the heated sintered members and the pyrolysis is concluded in a mist of water vapor that flows by.

In an embodiment of the method of the present invention, the sintered members are immersed at least once into a dry manganese nitrate melt without a manganese dioxide additive before being immersed into the mixture composed of a dry melt of manganese nitrate and manganese dioxide powder and are subjected to a pyrolysis after every such immersion that is identical to the pyrolysis following the immersion into the mixture.

In an embodiment of the method of the present invention, the mist of water vapor is conducted by air baffles located in the furnace in such a manner that the created jet of water drops is prevented from washing the sintered members.

In an embodiment of the method of the present invention, the sintered members are introduced into the furnace without pre-drying step.

In an embodiment of the method of the present invention, after the pores in the interior of the sintered member have been filled, potentially in a plurality of immersion and pyrolysis steps, an intermediate forming is carried out before the production of the manganese dioxide layers from a dry manganese nitrate melt.

In an embodiment of the method of the present invention, the manganese nitrate melt has approximately 40 to about 60 percent by weight manganese dioxide particles added to it. In an embodiment of the method of the present invention, the manganese dioxide particles have a grain size that is less than or equal to 180 m.

In an embodiment of the method of the present invention, a manganese nitrate solution having a density of approximately 1.1 to about 1.4 g/cm$^3$ is used for filling the pores.

In an embodiment of the method of the present invention, a dry melt is utilized having a density of approximately 1.8 to about 2.0 g/cm$^3$.

In an embodiment of the method of the present invention, silicon dioxide is added to at least the manganese nitrate solutions or melts. In an embodiment, preferably, approximately 0.5 to about 10 percent by weight silicon dioxide is added. In an embodiment, preferably, the density of a dry manganese nitrate melt having manganese dioxide and silicon dioxide additives is set to approximately 2.0 to about 2.6 g/cm$^3$ by adding distilled water. Preferably, silicon dioxide that is produced from SiCl$_4$ by oxyhydrogen gas hydrolysis and that has a particle size of approximately 7 to about 40 nm is used.

Additional features and advantages of the present invention are described in, and will be apparent from, the detailed description of the presently preferred embodiments an from the drawings.

BRIEF DESCRIPTION OF THE DRAWINGS

FIG. 1 illustrates residual current distributions of traditional capacitors and capacitors manufactured according to the present invention after long-term tests under voltage.

FIG. 2 illustrates residual current distributions of traditional capacitors and of capacitors manufactured according to the present invention after being stored in water vapor voltage-free.

DETAILED DESCRIPTION OF THE PRESENTLY PREFERRED EMBODIMENTS

The present invention provides a method for manufacturing solid electrolyte capacitors wherein the pores in the interior of the sintered member are first nearly filled with manganese dioxide by pyrolysis of solutions containing manganese nitrate, the sintered members are then immersed once or repeatedly into a mixture that is composed of a dry melt of manganese nitrate and manganese dioxide powder, and the pyrolysis is executed in a furnace after every immersion such that the sintered members are first heated to about 100° C. within a few seconds in a dry atmosphere and fine drops of water are subsequently applied onto the surface of the heated sintered members and the pyrolysis is concluded in a mist of water vapor that flows by.

For certain specific applications, it is advantageous to immerse the sintered members once or repeatedly into a dry manganese nitrate melt or manganese dioxide additive before the immersion into the mixture composed of a dry melt of manganese nitrate and manganese dioxide powder. The sintered members are then subjected to a pyrolysis after every immersion that is identical to the pyrolysis after the immersion into the mixture.

Preferably, the flow of the mist of water vapor is directed by air baffles located in the furnace. The baffles prevent a washing of the sintered members by the jet of water drops.

In a preferred embodiment, the sintered members are introduced into the furnace without pre-drying.

After filling the pores in the inside of the sintered member in, potentially, a plurality of immersion and pyrolysis steps, an intermediate forming can be carried out before the production of the manganese dioxide layers from dry manganese nitrate melt.

The manganese nitrate solution used for filling the pores preferably has a density of about 1.1 through 1.4 g/cm$^3$. The dry manganese nitrate melt, for example, a melt of tetrahydrate (Mn(NO$_3$)$_2 \times 4$ H$_2$O), has a density of approximately 1.8 to about 2.0 g/cm$^3$. The additive of manganese dioxide particles preferably amounts to approximately 40 to about 60 percent by weight. The manganese dioxide particles used have a grain size less than or equal to 180 m.

In an embodiment of the present invention, silicon dioxide, preferably approximately 0.5 to about 10 percent by weight, is added to at least the manganese nitrate solutions and/or melts. The silicon dioxide is preferably produced from SiCl$_4$ by oxyhydrogen gas hydrolysis and, for example, have a particle size of approximately 7 to about 40 nm.

Formed tantalum sintered members are immersed into an aqueous manganese nitrate solution having a density of about 1.3 g/cm$^3$. They are subsequently pyrolysed at approximately 200 to about 250° C. in an atmosphere containing water vapor. A nearly complete filling of the pores in the sintered members with manganese dioxide is achieved by one to three such pyrolyses.

Depending on the size of the pores in the sintered member, it may be desirable to add amorphous silicon dioxide to the manganese nitrate solution as a thixotropic thickener. The silicon dioxide exhibits a large active surface due to oxyhydrogen gas hydrolysis. Such silicon dioxide is commercially available, for example, under the tradename "Aerosil". It has been found that approximately 0.5 to about 10 percent by weight of silicon dioxide having a particle size of approximately 7 to about 40 nm is suitable as an additive.

Following the pyrolysis processes, the sintered members are subjected to an anodic reforming process. The process eliminates any defects in the oxide layer that were created by the heat of the process.

After the pores in the sintered members have been nearly filled in the way set forth, the sintered members are imersed into a dry manganese nitrate melt of Mn(NO$_3$)$_2$.4 H$_2$O having a density of, for example, 1.8 g/cm$^3$. Further manganese dioxide layers can thereby be produced by pyrolysis. Approximately 40 to about 60 percent by weight of MnO$_2$ powder ($\beta$ MnO$_2$) and, potentially, approximately 0.5 to about 10 percent by weight of amorphous silicon dioxide having the properties set forth above can be added to the manganese nitrate melt.

The MnO$_2$ powder preferably has the following grain sizes:

| | |
|---|---|
| <180 μm | 99.9% |
| 75–180 μm | 5.0% |
| 45–75 μm | 10.0% |
| <45 μm | 85.0% |

In an embodiment of the present invention, the powder is composed of the following mixture: 60 percent by weight Mn(NO$_3$)$_2$ . 4 H$_2$O; and 40 percent weight MnO$_2$ to which approximately 0.5 percent by weight SiO$_2$ powder is added. By adding distilled water, the density of the mixture can be set, for example, to approximately 2.0 g/cm$^3$.

The sintered members, immersed in the mixture, are subsequently introduced into a pyrolysis furnace without a predrying step. The sintered members are thereby first heated, within a few seconds, to about 100° C. in hot dry furnace air; the time required is dependent on the size of the sintered members. What is critical is that the sintered members are heated to this temperature.

Fine drops of water are subsequently blown onto the surface of the moistened sintered members. What is critical is that one part of the drops of water, accelerated by compressed air, does not evaporate until after impacting the sintered members and is extracted from the volume of the furnace with the nitrous gases that arises. In the end phase of the pyrolysis, the sintered members are located in a mist of flowing water vapor having a temperature of approximately 200 to about 350° C.

As previously stated, it is desirable to control the flow of air in the furnace with air baffles to prevent the sintered members from being washed by the jet of water drops.

Due to the rapid introduction of the immersed sintered members into the furnace, that initially contains only dry air a decomposition of the manganese nitrate occurs in the dry air. Due to the dry mixture, little water is thereby produced from the inner regions of the mixture and $MnO_2$ thereby is produced that is similar to that produced through a decomposition in dry air.

The $MnO_2$ created during the initial phase of the decomposition, however, is still permeated with manganese nitrate. The manganese nitrate is not decomposed until the further course of the pyrolysis with water or, respectively, water vapor. A smooth and nearly pore-free $MnO_2$ layer arises thereby due to the water that is not applied until after the beginning of the decomposition.

The described mixture of manganese nitrate and manganese dioxide powder not only yields, in one immersion, a thicker coat, but, also produces a denser $MnO_2$ layer due to the release of lower quantities of gas with reference to the thickness of the manganese nitrate moistening the sintered members. The particles of the added $MnO_2$ powder do not emit any gas and are bonded by the $MnO_2$ arising in the pyrolysis.

A pyrolysis of this mixture thus leads to a $MnO_2$ layer having a thickness that is typically only achieved in traditional pyrolysis after eight to about ten decompositions. The percentage of larger $MnO_2$ grains leads to an adequate mechanical stability of the $MnO_2$ layer on the sintered members.

The use of a silicon dioxide additive that is a thixotropic thickener guarantees a sufficient moistening of the sintered members so that an adequately thick $MnO_2$ layer (approximately 100 to about 250 μm) is achieved with one through three immersions. The added silicon dioxide facilitates not only the immersion of the sintered members due to the thixotroping effect, but, as a result of the active surface, also creates a pronounced adsorption of ionogenic impurities. This adsorption is desirable for capacitors that are to be housed in a plastic housing. As previously stated, a plastic housing does not offer complete protection against the penetration of moisture. The ionic impurities mobilized by moisture that has penetrated the housing are absorbed by the silicon dioxide and therefore contribute less to the leakage currents that arise due to defective locations in the dielectric.

Referring now to FIG. 1, there is illustrated the result of a long-term test at capacitors having the nominal data 20 μ F/20 V that were stored for 1,000 hours at 85° C. and 95% relative humidity. FIG. 1 presents the residual currents $I_R$ versus the percentage of capacitors. Curve 1 represents capacitors having a cathode coat that were manufactured according to the method of the present invention. Curve 2 represents capacitors having traditional cathode coats FIG. 1 demonstrates that the capacitors manufactured according to the present invention exhibit approximately no failures, whereas nearly 15% of the traditional capacitors failed.

What is known as the vapor pressure test provides another method of carrying out extremely time-compressing comparative tests on capacitors. In the vapor pressure tests, the capacitors are stored at a temperature of approximately 110° C. at a pressure of approximately 2 bars.

Referring now to FIG. 2, there is illustrated the results of such a vapor pressure storage test wherein the capacitors were stored for 40 hours voltage-free in water vapor at 100° C. and a pressure of approximately 2 bars. The distribution of the residual currents $I_R$ versus the percentage of capacitors is indicated in FIG. 2. Curve 3 represents capacitors that were manufactured according to the method of the present invention. Curve 4 represents traditional capacitors.

Even under these extreme conditions, the capacitors manufactured according to the present invention only exhibit a slight number of failures (less than 10%). In contrast, however, nearly half of the traditional capacitors failed under the conditions of the vapor pressure tests.

The residual currents on which FIGS. 1 and 2 are based were identified at room temperature and nominal voltage $U_N$ of the capacitors.

As is apparent from the preferred embodiments of the present invention set forth above, the manganese dioxide layer produced by the present invention is smoother and has fewer pores than the traditionally manufactured layers. This diminished porosity in the cathode coat makes a migration of conductive particles due to water inclusion more difficult, whereby adsorption events of silicon dioxide having a large active surface additionally lead to reduced diffusion. The capacitors manufactured according to a method of the present invention are therefore excellently suited for integration in a plastic housing.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method for manufacturing solid electrolyte capacitors comprising a sintered anode member composed of a valve metal, an oxide layer arranged on the anode member and serving as a dielectric, a semiconducting electrolyte layer composed of manganese dioxide that is produced by repeated immersion into a solution or melt containing manganese nitrate and by subsequent pyrolytic decomposition, comprising the steps of: arranging a graphite layer on the manganese dioxide layer and a soft-solderable layer thereon, wherein the pores in the interior of the sintered members are first nearly filled with manganese dioxide by pyrolysis of solutions containing manganese nitrate, the sintered members are then immersed at least once into a mixture that is composed of a substantially dry melt of manganese nitrate and manganese dioxide powder, and the pyrolysis is carried out in a furnace after every immersion such that the sintered members are first heated to approximately 100° C. within a few seconds in a dry atmosphere and, following thereupon, fine drops of water are applied onto the surface of the heated sintered members and the pyrolysis is concluded in a mist of water vapor that flows by.

2. The method of claim 1 including the additional step that the sintered members are immersed at least once into a substantially dry manganese nitrate melt without a manganese dioxide addictive before being immersed into the mixture composed of a substantially dry melt of manganese nitrate and manganese dioxide powder and are subjected to a pyrolysis after every such immersion that is identical to that following the immersion into the mixture of the substantially dry melt of manganese nitrate and manganese dioxide powder.

3. The method of claim 1 wherein the mist of water vapor is directed by air baffles located in the furnace so that a resultant jet of water drops is prevented from washing the sintered members.

4. The method of claim 1 wherein the sintered members are introduced into the furnace without pre-drying.

5. The method of claim 1 wherein after the pores in the interior of the sintered member have been filled, forming an intermediate dielectrically effective oxide layer before the production of a manganese dioxide layer from a substantially dry manganese nitrate melt.

6. The method of claim 1 wherein the substantially dry melt of manganese nitrate has approximately 40 to about 60 percent by weight manganese dioxide particles added to it.

7. The method of claim 6 including the use of manganese dioxide particles having a grain size of less than or equal to 180 um.

8. The method of claim 1 including a manganese nitrate solution having a density of approximately 1.1 to about 1.4 g/cm$^3$ for filling the pores.

9. The method of claim 1 including the use of a substantially dry melt having a density of approximately 1.8 to about 2.0 g/cm$^3$.

10. The method of claim 1 wherein silicon dioxide is added to at least one of the manganese nitrate solutions and/or melts.

11. The method of claim 10 wherein approximately 0.5 to about 10 percent by weight silicon dioxide is added.

12. The method of claim 10 wherein the density of said substantially dry manganese nitrate melt having manganese dioxide and silicon dioxide additive is set to approximately 2.0 to about 2.6 g/cm$^3$ by adding distilled water.

13. The method of claim 10 including the use of silicon dioxide that is produced from SiCl$_4$ by oxyhydrogen gas hydrolysis and has a particle size of approximately 7 to about 40 nm.

14. A method for manufacturing solid electrolyte capacitors comprising a sintered anode member composed of a valve metal, an oxide layer located on the anode member and functioning as a dielectric, and a semiconducting electrolyte layer composed of manganese dioxide that is produced by repeated immersion into a solution containing manganese nitrate and by subsequent pyrolytic decomposition, comprising the steps of:
  arranging a graphite layer on the manganese dioxide layer and a soft-solderable layer thereon, wherein the pores in the interior of the sintered members are nearly filled with manganese dioxide by pyrolysis of solutions containing manganese nitrate;
  immersing the sintered members at least once into a mixture composed of a substantially dry manganese nitrate melt;
  then immersing the sintered members at least once into a mixture including a substantially dry melt of manganese nitrate and manganese dioxide powder; and
  carrying out pyrolysis in a furnace after every immersion such that the sintered members are first heated in a dry atmosphere and then water is applied onto the surface of the heated sintered members and the pyrolysis is concluded in water vapor.

15. The method of claim 14 wherein the sintered members are introduced into the furnace without pre-drying.

16. The method of claim 14 wherein silicon dioxide is added to at least one of the manganese nitrate solutions.

17. The method of claim 16 wherein the density of the substantially dry manganese nitrate melt having manganese dioxide and silicon dioxide additive is set to approximately 2.0 to about 2.6 g/cm$_3$ by adding distilled water.

* * * * *